March 9, 1943.  A. R. THOMPSON  2,313,375
CUT STRING BEAN GRADER
Filed Oct. 6, 1939  4 Sheets-Sheet 1
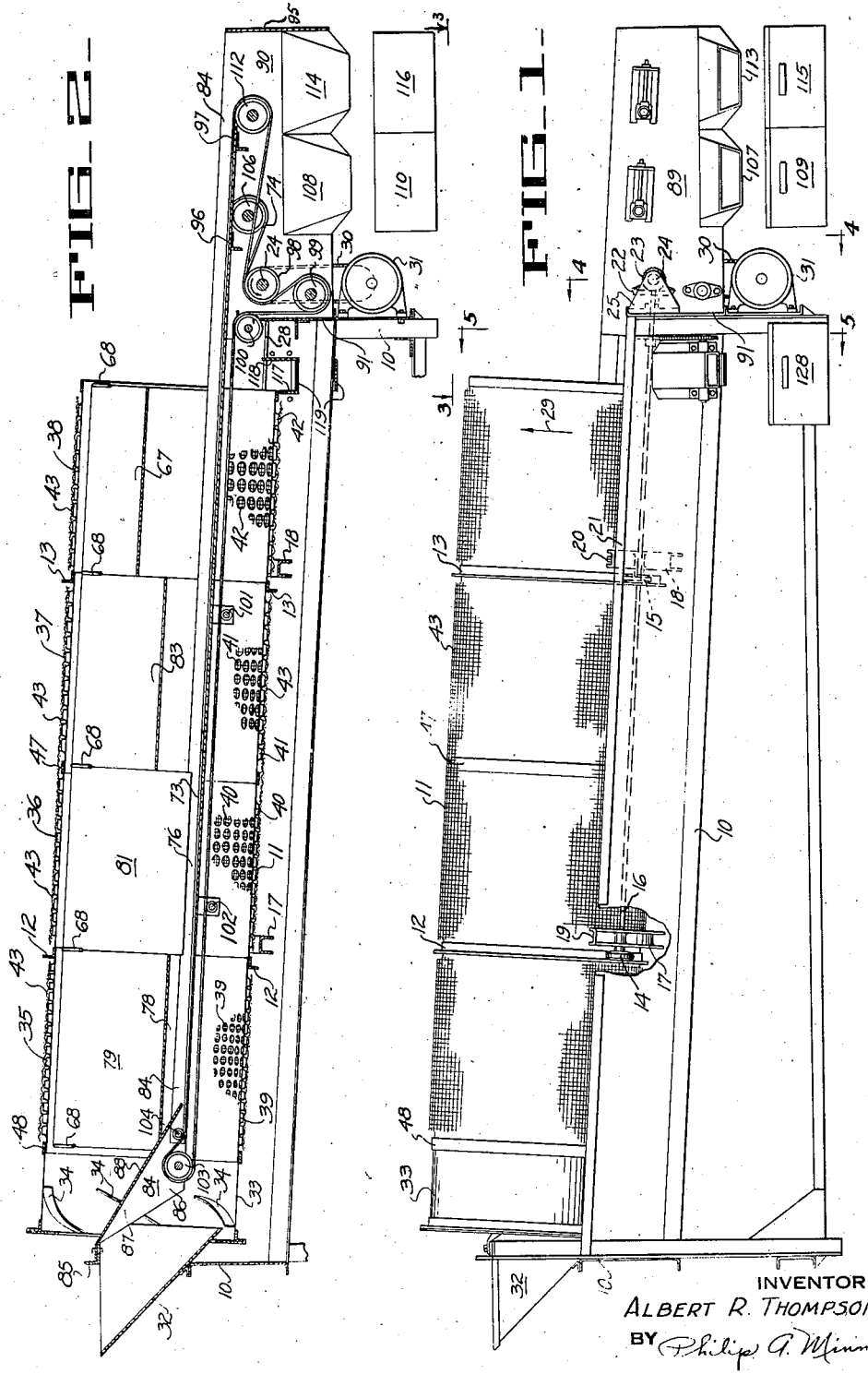
INVENTOR
ALBERT R. THOMPSON
BY Philip G. Minnis
ATTORNEY March 9, 1943.     A. R. THOMPSON     2,313,375
CUT STRING BEAN GRADER
Filed Oct. 6, 1939     4 Sheets-Sheet 2
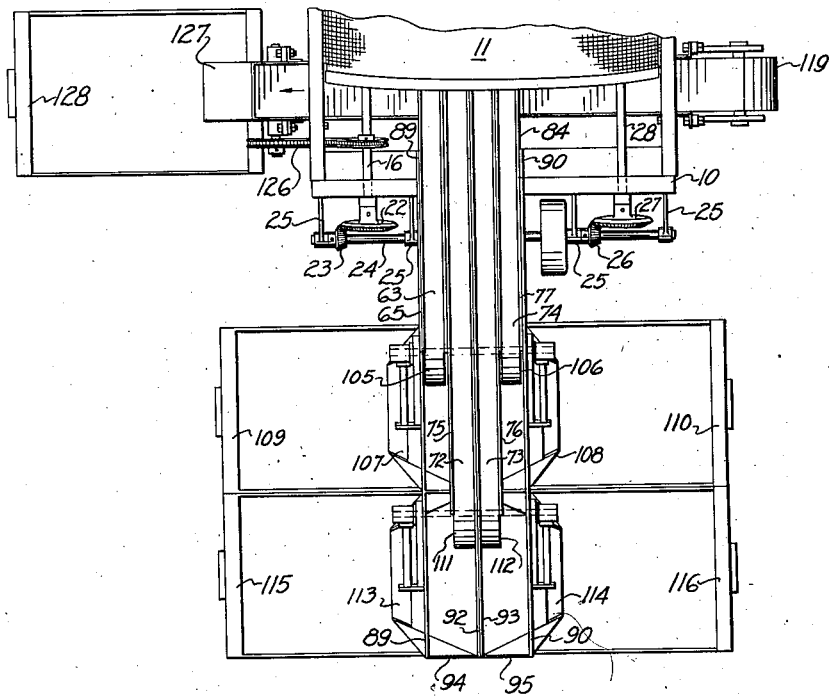
FIG_3_
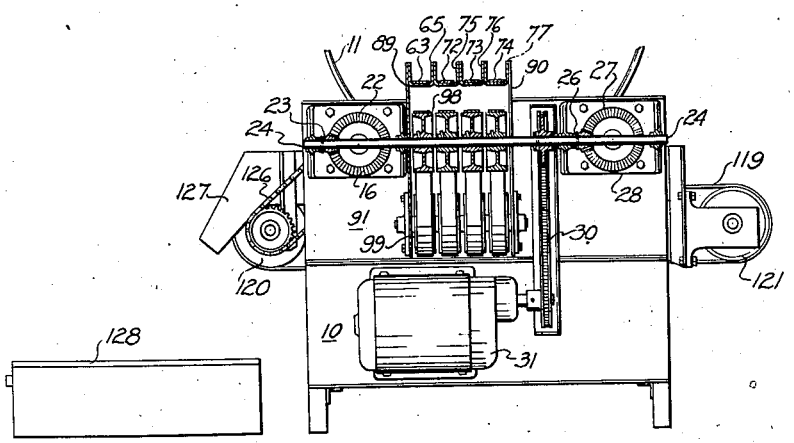
FIG_4_
INVENTOR
ALBERT R. THOMPSON
BY
ATTORNEY March 9, 1943.  A. R. THOMPSON  2,313,375
CUT STRING BEAN GRADER
Filed Oct. 6, 1939  4 Sheets-Sheet 3
FIG_5_
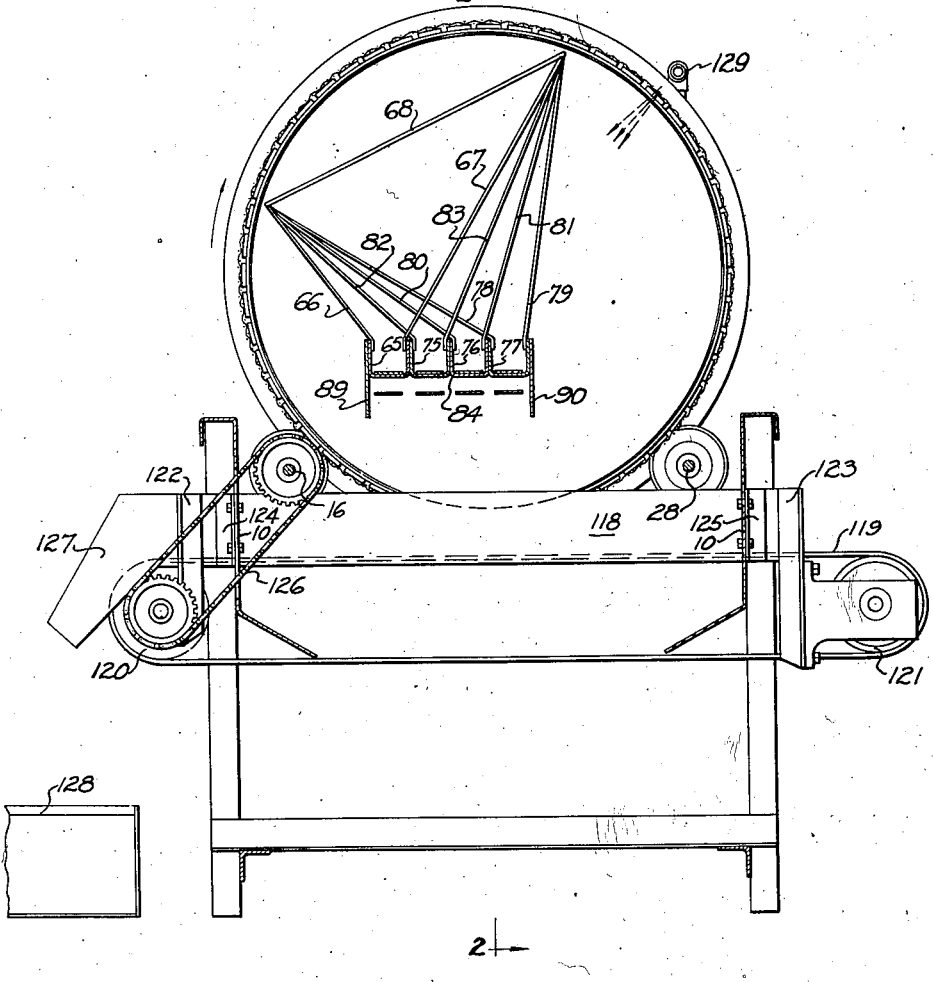
FIG_6_
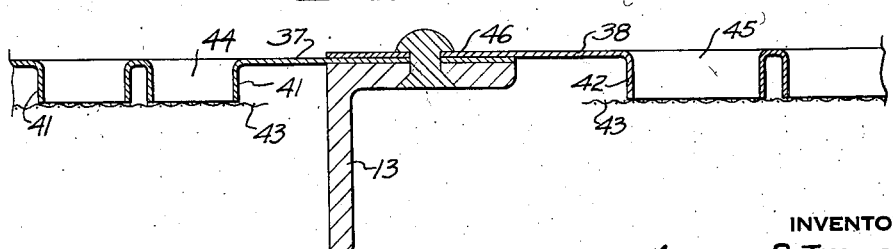
INVENTOR
ALBERT R. THOMPSON
BY Philip A. Minnis
ATTORNEY

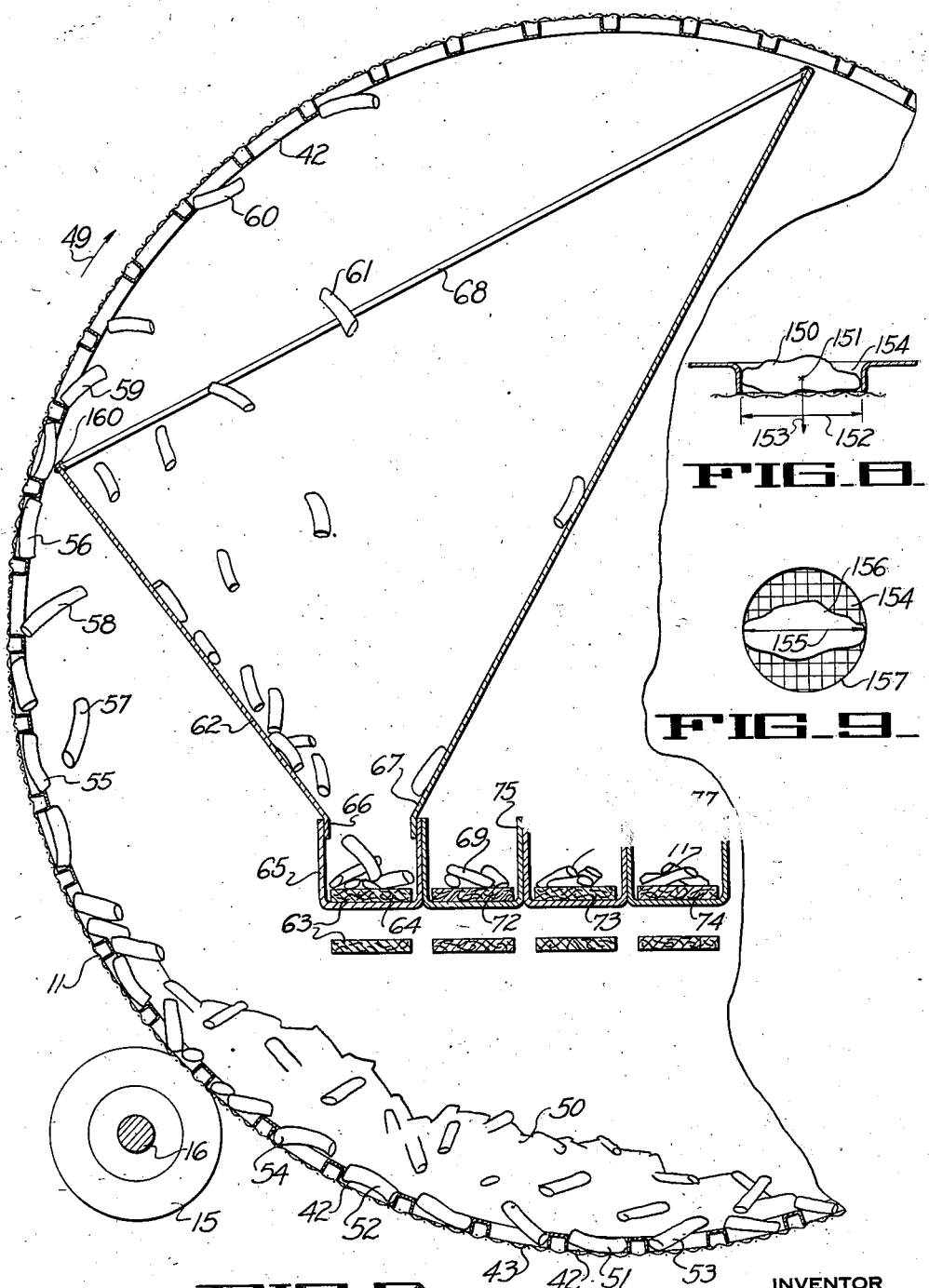

Patented Mar. 9, 1943

2,313,375

UNITED STATES PATENT OFFICE 2,313,375

CUT STRING BEAN GRADER

Albert R. Thompson, Los Gatos, Calif., assignor to Food Machinery Corporation, San Jose, Calif., a corporation of Delaware Application October 6, 1939, Serial No. 298,226

1 Claim. (Cl. 209—95)

This invention relates to machines which are adapted to receive a mass of articles or pieces of different size and to select and sort out those pieces which are of a certain size and thus to separate and classify them into groups according to their size.

The invention is herein disclosed as embodied in a machine for grading pieces of cut string beans. However, it will be obvious after disclosure of the invention that it may be utilized to advantage in constructing machines for grading articles and pieces of many kinds too numerous to mention.

In preparing string beans for canning, the whole beans are subjected to preliminary preparations such as removal of the stems. Thereafter the whole beans are passed through a cutter which cuts each bean transversely of its length. The pieces of cut string beans which issue from this cutter are of varying length. It is necessary then to sort out the pieces according to their length because the length of the piece determines how it is to be canned. The longer pieces are selected for canning as string beans because they are attractive enough to be sold as an individual vegetable. The shorter pieces are selected for other uses which involve mixing with other vegetables, as in salads and soups. The determining factor in the grading of the pieces is, therefore, their length.

Accordingly, it is the principal object of this invention to provide a machine which will grade articles, such as cut pieces of string beans, by length.

Other objects of the invention can be better appreciated after a disclosure of a machine in which the invention is embodied.

In the drawings:

Fig. 1 is a side elevation of the machine.

Fig. 2 is a vertical longitudinal section thereof, as indicated by the arrows 2—2 in Fig. 2.

Fig. 3 is a plan view of the discharge end of the machine, the point of view being indicated by the arrows 3—3 in Fig. 1.

Fig. 4 is a transverse section taken as indicated by the arrows 4—4 in Fig. 1.

Fig. 5 is a transverse section taken as indicated by the arrows 5—5 in Fig. 1.

Fig. 6 is a fragmentary section showing details of construction.

Fig. 7 is an isolated transverse section to illustrate the mode of operation of the grader.

Figs. 8 and 9 are diagrams in section and plan, respectively, of a body seated in a recess.

The machine comprises, broadly, an inclined, revolving conveyor drum which has recesses of different sizes in its inner wall. These recesses pick out the pieces of correct size as the mass of pieces tumbles along the bottom of the drum. Selected pieces of a given size are deposited in a hopper from which they are carried out of the machine on a conveyor.

The supporting framework 10 (Figs. 1) is fabricated of rolled sections and formed steel plates secured together largely by welding with suitable gusset plates employed where needed. In this framework a cylindrical drum 11 is supported for rotation with its axis inclined to the horizontal. The drum 11 has two angles 12, 13 secured to it circumferentially which serve as circular tracks which engage with four rollers, two on each side of the drum, such as roller 14 engaging track 12 and roller 15 engaging track 13. These four rollers are the sole support of the drum 11. They also revolve the drum.

The rollers 14, 15 are secured to a shaft 16 which is journaled in two hangers 17, 18. These hangers are channel-sectioned castings, arcuate in shape so as to pass from one side of the framework under the drum 11 (Fig. 2) to the other side of the framework. The ends of the hangers are rigidly secured to the framework so that the hangers constitute, in effect, integral parts of the framework. In Fig. 1, the ends 19, 20 of the hangers 17, 18, respectively, are formed to fit over the top rail 21 of the framework and are secured thereto. The other ends of the hangers are similarly secured to the framework on the other side of the machine.

The shaft 16 has a bevel gear 22 secured thereto which meshes with a bevel pinion 23 on a transverse shaft 24 (Fig. 3) supported in bearing brackets 25 secured to the framework 10. A bevel pinion 26 on shaft 24 meshes with a bevel gear 27 secured to a shaft 28 which corresponds to the shaft 16 and is journaled in the hangers 17, 18 (Fig. 1) and carries rollers similar to the rollers 14, 15 for engaging the circular tracks 12, 13 on the drum 11. Rotation of the shaft 24 counterclockwise (Fig. 1) causes the drum 11 to rotate in the direction of arrow 29. The shaft 24 (Fig. 4) is driven by a chain drive 30 from a motor 31 mounted on the framework 10.

The cut string beans are deposited in the hopper 32 (Fig. 1) which is secured to the framework 10. The beans fall into the receiving end 33 (Fig. 2) of the drum 11. The receiving end 33 is a short cylindrical section of sheet metal fitted with curved flights 34 which assist in feeding the beans away from the hopper 32. The receiving end 33 is secured to the main body of the drum which comprises four cylindrical sections 35, 36, 37, 38 of sheet metal with circular extrusions 39, 40, 41, 42, therein. While only patches of these extrusions are shown in each section in Fig. 2 it is to be understood that the sheets of metal are uniformly covered with extrusions. The diameter of the extrusions increases from section to section. Each of the sections 35, 36, 37, 38 is covered externally with wire mesh screen 43.

As shown in Fig. 6, the screen 43 in covering the extrusions 41 makes, what would otherwise be a circular hole in the plate, a recess instead. Thus the screen 43 prevents the bean from passing through the hole produced by the extrusion 41 and provides with the cylindrical wall of the extrusion a recess 44 in which the bean can lodge if its length does not exceed the diameter of the recess. Similarly the screen 43 covering the exterior of the section 38 cooperates with the extrusions 42 to provide circular recesses 45 of greater diameter than the recesses 44 which therefore will admit larger pieces of beans. Fig. 6 also illustrates the overlapping joint 56 of the adjacent edges of the sheet metal sections 37, 38 which are riveted to the circular track 13. The other sections are similarly joined. The edges of sections 36 and 37 (Fig. 2) are joined together by attachment to a strap 47 which extends circumferentially of the drum. Sections 35 and 36 are joined to track 12 and section 35 is joined to end section 33 by a strap 48. As the drum revolves, the pieces of beans tumble down along the bottom of the drum. Pieces whose length is less than the diameter of the circular recesses 39 are separated out in the first section 35, next larger sizes in the succeeding sections 36, 37, 38 whose recesses 40, 41, 42 progressively increase in diameter. The manner in which pieces of a certain size are selected from the moving mass of beans is illustrated in Fig. 7.

To facilitate making the illustration the last section 38 (Fig. 2) was chosen because the recesses 42 therein are the largest size. The drum 11 is being revolved in the direction of arrow 49 by the rollers upon which it rests, the roller 15 appearing in Fig. 7. The mass of pieces of cut string beans 50 is tumbling down along the bottom of the drum toward the reader by reason of the inclination of the drum. Pieces such as 51, 52 have lodged in the recesses 42 and are lying flat against the screen 43 because their length is less than the diameter of the recesses. Longer pieces, such as 53, 54 cannot fit into the recesses. The pieces which are of the correct length are carried upward by the drum. Such pieces are indicated at 55, 56. These pieces remain fitted in their recesses, and the action of centrifugal force resulting from the speed of rotation of the drum holds these pieces in their recesses until the recesses have passed through the horizontal. Pieces, such as 57, 58, which are too long fall out of the recesses and return to the pile 50 at the bottom of the drum. When the recesses are elevated above the horizontal they overturn and the pieces which were lodged therein drop out as indicated at 59, 60, 61, and are collected in a hopper 62. The top edge 160 of the side 66 of the hopper is located at the beginning of the discharge zone, that is, at the point where the force of gravity overcomes the centrifugal force and pulls the pieces out of the recesses.

It will be noted in Fig. 7 that the recesses in the drum are relatively shallow, their depth being less than their diameter. By making the depth of the recess less than the length of the piece of string bean, the piece, in order to be wholly received within the pocket and carried up by rotation of the drum in the manner illustrated by the piece 56 (Fig. 7), must be positioned transversely of the pocket with its length lying substantially in the direction of a diameter of the pocket. By this construction the piece cannot be separated from the mass 50 unless it has assumed the size-gauging position in the pocket, i. e., with its length lying in the direction of a diameter of the pocket. The pieces are thus prevented from being erroneously removed from the mass as would be the case if the pocket were deep enough to permit the piece to assume any other position in which the diameter of the pocket would be inconclusive as to the length of the piece. One of the characteristics of this construction and mode of operation is that the pocket is dimensioned to admit only a single piece so that the pieces are individually gauged.

The hopper 62 collects all the pieces discharged from the recesses 42 and directs them onto a belt conveyor 63 which removes them from the drum. The upper stretch 64 of the conveyor 63 runs in a trough 65 to the vertical walls of which are welded the sheet metal sides 66, 67 of the hopper 62. The upper edges of the sides are braced by a rod 68 welded thereto. The progressively smaller sizes of pieces 69, 70, 71 are conducted out of the drum on conveyors 72, 73, 74 running in troughs 75, 76, 77.

The arrangement of the hoppers and conveyors will be explained by reference to Figs. 2 and 5. The hopper which collects the smallest size pieces discharged from the recesses 39 has two sheet metal sides or walls 78, 79 coextensive with section 35 and welded at the bottom to trough 77. The hopper which collects the next size pieces discharged from the recesses 40 has two sides 80, 81 coextensive with section 36 and welded at the bottom to trough 76. The hopper which collects the third size pieces discharged from the recesses 41 has two sides 82, 83 coextensive with section 37 and welded at the bottom to trough 75. And, as already described, the sides 66, 67 of the hopper which collects the fourth size pieces from the recesses 42 are coextensive with section 38 and secured to trough 65. The upper edges of the hopper sides are braced by the rods 68. If desired, V-shaped end plates could be used in place of the rods 68. These end plates would also serve as partitions between the hoppers so that each hopper would be four-sided.

The four troughs 65, 75, 76, 77 are channels. Adjacent side walls of the channels are welded together so that they constitute, in effect, a sub-frame 84 which supports the hoppers and the conveyors. The upper end of the sub-frame 84 (Fig. 2) is supported from a cross-piece 85 of the main framework 10 by means of a sheet metal hanger 86 which has vertical sides, such as 87, and a transversely-extending inclined portion 88 which prevents un-sized pieces in the receiving end 33 from getting onto the conveyors, and vice versa. The hanger 87 is secured to the cross-piece 85 and welded to the sub-frame 84. Two plates 89, 90 (Figs. 1, 2, 3, 4, and 5) are welded to the outer sides of the sub-frame 84 at the discharge end. The plates 89, 90 are welded to a transverse gusset 91 which is part of the main framework 10. The two adjacent central flanges 92, 93 (Fig. 3) of the sub-frame 84 extend to the extreme end of the machine and are connected to the plates 89, 90 by transverse plates 94, 95. Two angles 96, 97 (Fig. 2) are welded to the bottom of the sub-frame 84 and their ends are welded to the side plates 89, 90. Thus the plates 89, 90 become an integral part of the sub-frame 84.

A system of pulleys is provided for driving each of the four belt conveyors. The shafts of these pulleys are supported in the sub-frame. The four driving pulleys 98 (Figs. 2 and 4) are secured to the power-driven shaft 24. The four belts 63, 72, 73, 74 then pass around the following sets of four pulleys: 99, 100, 101, 102, 103, 104. The pulleys 104 depress the belts 63, 72, 73, 74 into the troughs 65, 75, 76, 77. The outer belts 63, 74 (Figs. 2 and 3), pass around pulleys 105, 106 and discharge their beans into chutes 107, 108 from which they are collected in boxes 109, 110. The inner belts pass around pulleys 111, 112 and discharge their beans into chutes 113, 114 from which they are collected in boxes 115, 116.

The largest-size pieces of beans which were rejected by the recesses 42 (Fig. 2) in section 38 of the drum 11 are discharged from the open end of the drum into a trough having side walls 117, 118 which directs the beans onto a transverse conveyor belt 119. Two pulleys 120, 121 (Fig. 5) are provided for the belt 119. The shafts of these pulleys are supported in brackets 122, 123, secured to the sides 117, 118 of the trough, which sides are secured by angles 124, 125 to the main framework 10. The pulley 120 is driven by a chain drive 126 from shaft 16. The trough has a chute 127 at the discharge end from which the beans are collected in a box 128.

The recesses in the drum are cleaned by compressed air from a pipe 129 (Fig. 5) extending the length of the drum and having orifices opposite the circumferential rows of recesses. This is one of the advantages obtained by the use of the screen covering. It also reduces the weight of the drum and because of its use the beans do not tend to adhere to the bottom of the recesses when they are turned bottom side up for discharge.

It is thought to be apparent from inspection of Fig. 7 in the light of the foregoing description that pieces in the pile 59 could be other than pieces of beans. Any article or particle could be graded by this method. However, it is particularly suited to the problem of grading irregularly-dimensioned articles which have one dimension exceeding its other dimensions. This dimension may be a length in articles of various solid shapes, as the length of a cylinder, the length of a major planar face which may be any of the quadilaterals, such as the square, the rectangle, the trapezium, etc., or the length of the diameter of a circular planar face, such as a peach half: in other words, any article which, because of its shape, tends by the force of gravity to assume a position in which its length or maximum dimension is horizontal. Figs. 8 and 9 show by way of illustration an irregularly-dimensioned article 150 of any shape the center of gravity of which is located at 151. Such an article tends when agitated to assume a position in which its maximum dimension 152 is horizontal or at right angles to the line 153 of the force of gravity. Such an article can be sized by my method by providing a cylindrical recess 154 positioned with its axis vertical, agitating the article until it falls into the recess, and then extracting the articles selected by the recesses. The determination of size is obtained by the diameter 155 (Fig. 9) of the recess 154. The diameter 155 is the measure of the maximum dimension 152 of the projection 156 of the body 150 into the horizontal plane because as viewed in Fig. 9 the circle 157 is circumscribed about the horizontal projection 156.

While I have shown an inclined drum for grading the articles, it is to be understood that the drum could be placed in a horizontal position and suitable means could be provided for feeding the articles along it. Also, while it is convenient in the case of beans to employ a drum, it will be apparent that the sizing recesses could be in any moving surface or conveyor such as pockets in an endless belt or draper, which would perform the same function of extracting pieces of the right size from a mass and rejecting those of incorrect size both by the size of the recess and the upturning thereof by the motion of the conveyor.

While I have described a particular embodiment of the present invention, it will be obvious that various changes and modifications may be made in the details thereof without departing from the spirit of the present invention and the scope of the appended claim.

Having thus described my invention and in what manner the same may be used, what I claim as new and desire to protect by Letters Patent is:

A grader for cut string beans and the like having a rotatable drum adapted to receive the pieces of cut string beans which are to be separated according to size, said drum being constructed of sheet metal and having cylindrical pockets, the cylindrical wall of each pocket projecting outwardly from the drum to provide a pocket having a depth greatly exceeding the thickness of the sheet metal of which the drum is constructed, the depth of said pocket being slightly greater than the thickness of a string bean, whereby a piece of cut string bean may lodge in said pocket and be entirely received therein provided the length of the piece is less than the diameter of said cylindrical pocket so that the piece can lie transversely of the pocket in size-gauging position.

ALBERT R. THOMPSON.

CERTIFICATE OF CORRECTION.

Patent No. 2,313,375.  March 9, 1943.

ALBERT R. THOMPSON.

It is hereby certified that error appears in the printed specification of the above numbered patent requiring correction as follows: Page 1, first column, line 41, for "Fig. 2" read --Fig. 5--; and second column, line 29, for "thet" read --the--; page 2, first column, line 25, for "joint 56" read --joint 46--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.